Sept. 23, 1958  R. H. JOHNSTON  2,852,941
GYROSCOPE DAMPING STRUCTURE AND METHOD OF MAKING
Filed Jan. 25, 1956
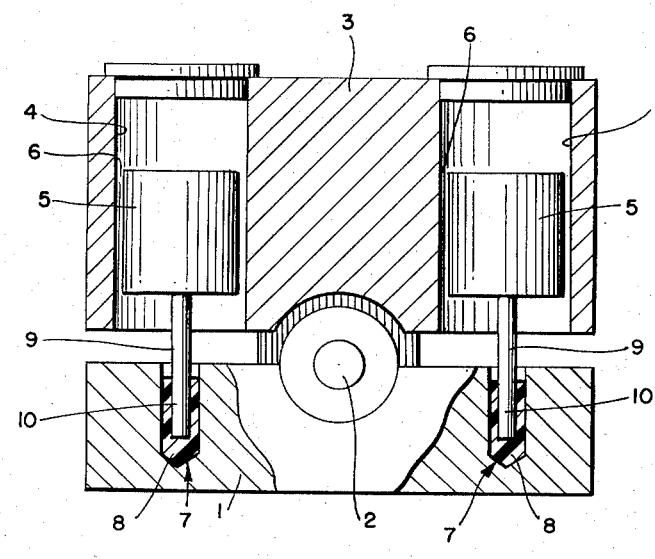
INVENTOR:
RALPH JOHNSTON
BY
Margall, Johnston, Cook & Root,
ATT'YS

United States Patent Office 2,852,941
Patented Sept. 23, 1958

2,852,941

GYROSCOPE DAMPING STRUCTURE AND METHOD OF MAKING

Ralph H. Johnston, Grand Rapids, Mich., assignor to R. C. Allen Business Machines, Inc., Grand Rapids, Mich., a corporation of Michigan Application January 25, 1956, Serial No. 561,188

10 Claims. (Cl. 74—5.5)

This invention relates to miniature gyroscopes and, more particularly, to a dashpot damping structure such as may be used in the turn rate gyroscope disclosed in the copending patent application of Jack B. Kuipers, Serial No. 464,047, filed October 22, 1954, and assigned to the present assignee.

Conventional gyroscope structures ordinarily include a member adapted to spin rapidly about a spin axis and supported upon a gimbal structure. The gimbal structure is mounted to pivot about an output axis at right angles to the spin axis. When an operating gyroscope is rotated about an input axis, which is mutually at right angles to both the spin axis and the output axis, a gyroscopic force is present tending to pivot the gimbal about the output axis. In a rate-of-turn indicator, the gimbal may be restrained by springs, the gyroscopic force tending to rotate the gimbal by compressing one spring and extending the other. The amount of force exerted against the springs is measurable and indicates the rate-of-turn of the gyroscope about the input axis.

The gimbal structure with restraining springs is subject to resonant oscillation which would render the gyroscope unstable, and therefore such oscillation must be suppressed. The aforesaid copending application discloses a pair of dashpots containing pistons of thermoplastic material such as nylon and have flexible piston rods rigidly affixed to the gimbal structure. The nylon pistons move linearly through a viscous medium in the dashpots and, thus, function to damp the oscillations in the gimbal to which they are attached by flexible piston rods.

In a well designed gyroscope, the amount of deviation of the gimbal structure from its normal position may be only two or three degrees of rotation, and the corresponding linear movement of the piston may be only a few thousandths of an inch. Since this movement is so slight, it is necessary to attach rigidly the piston rods to the gimbal for eliminating all play, or back-lash, in the linkage system, as even a small amount of lost motion would result in considerable error and instability in view of the small normal excursion of the piston.

The clearance between the piston and the cylinder is very small, and the piston must be precisely aligned to provide a uniform clearance around the circumference thereof. Heretofore, in the manufacture of a dashpot system, the alignment of each piston has proved to be a very delicate and time-consuming task.

It is an important object of the present invention to provide a simplified structure, and method of manufacture, whereby the pistons may be quickly and simply inserted into the dashpot cylinders whereby a precise alignment within the piston is accomplished, as the flexible piston rod is affixed to the gimbal structure.

It is another object of this invention to provide an improved dashpot structure for a gyroscope having essentially no play or back-lash in the linkage thereof, and the pistons are precisely centered within the dashpot cylinders.

A further object of this invention is to provide a method of manufacture and assembly of a dashpot structure for a gyroscope wherein the thermo-expansion characteristics of the piston are used advantageously to accomplish a self-alignment of the piston in the cylinder; the piston being first placed loosely within the cylinder, the entire assembly thence being heated to expand and lodge the piston firmly, the dashpots and the gimbal structure thence being assembled with the piston rod firmly positioned in correct alignment.

Another object is to employ a simplified method and means for affixing the piston rods to the gimbal structure by employing thermo-setting plastic material which may be poured into pockets in the structure; the piston rods then may be inserted into pockets containing liquid plastic, and by heating the entire structure, the plastic material is caused to set, thereby securing the rods in the pockets and to the gimbal.

A more complete understanding of the present invention, its mode of operation and its advantages may be gathered from the following specification, together with an inspection of the accompanying drawing in which there is shown an enlarged sectional view of a part of the gimbal structure of a miniature gyroscope, similar to the gyroscope of the aforesaid copending application.

The construction herein shown for the purpose of illustrating the present invention comprises a horizontal arm 1 which constitutes a part of the gimbal structure of a gyroscope. The arm 1 is mounted to pivot about an axis 2, which is the output axis of the gyroscope. When the gyroscope, while operating, is rotated about a vertical or input axis, a force will be present tending to turn the gimbal arm 1 about its axis 2. The fixed structure part 3 of the gyroscope contains a pair of cylinders 4 forming dashpots. This structure part 3 may be formed of suitable metal, such as steel or brass.

Each dashpot or cylinder 4 may contain a nylon piston 5; and since the nylon piston has a coefficient of thermo-expansion greater than the steel or brass cylinder, a clearance 6 between the piston 5 and its cooperating cylinder 4 is subject to variation, dependent upon temperature. The entire structure herein shown is adapted to be immersed in oil, or other suitable viscous medium, contained in an outer surrounding casing (not shown). The viscosity of the viscous medium is variable and likewise subject to temperature variations. The gyroscopic instrument of the invention, thus, is adapted to operate within a wide range of temperatures, since the frictional drag of the piston 5 within its cylinder 4 remains substantially constant because the variable clearance between the piston and the cylinder compensates for the variation in the viscosity of the medium.

The device of the invention is assembled by placing the pistons 5 within their respective cylinders 4 with piston rod of each piston extending downwardly. Sockets 7 are provided in the top of the arm 1 of the gimbal to provide pockets which are filled with a thermo-setting plastic, such as uncured epoxy resin 8. The vertical center line of the pockets 7 are positioned in vertical alignment with the axial center line of the pistons to receive flexible piston rods 9. The rods 9 extend downwardly into the sockets or pockets 7 and have the lower end 10 thereof suspended in the resin 8 in the pockets 7. The entire gyroscope structure is then placed in an oven and heated to a temperature sufficient to expand the pistons 5 and to lodge them firmly within their respective cylinders 4. With the heating, the thermo-setting plastic within the pockets 7 then becomes cured or hardened to maintain the ends 10 of the piston rods 9 firmly in the arm 1 of the gimbal. The heating treatment causes the pistons to expand to an extent greater than the cylinders and sufficient to bring the piston walls in contact with the cylinder walls and cause the pistons to become lodged firmly within their cylinders. The resin is cured into solid form by the heating operation and holds the rods 9 in proper aligned position with respect to their cylinders. Since the resin is a liquid when the curing cycle starts the rods can seek the position demanded by the centered piston. After later being cooled, the pistons contract uniformly, leaving a precise concentric gap between each piston 5 and its cylinder wall 4.

The dashpot structure of this invention is economical to manufacture and assemble, and it is unnecessary to clamp the piston rods 9 with delicate precision, such as has been heretofore required.

Although the damping structure herein described includes dashpots positioned on the stationary part of the gyroscope and piston rods attached to the gimbal, it will be appreciated that the elements could be reversed with the dashpots positioned on the gimbal and the piston rods secured in cavities in the stationary part. The teachings of this invention can be practiced in any device to damp out unwanted oscillations which may appear between two cooperating parts, such a dashpot positioned on one part and the piston rod secured to the other.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. The method of assembling and aligning a thermally expandable piston in a cylinder and connecting the piston to a cooperating structure, said piston having a piston rod, comprising inserting the piston into the cylinder, heating the piston to a temperature sufficient to expand and lodge the piston firmly within the cylinder, and securing the piston rod to said cooperating structure while the piston is lodged firmly in the cylinder.

2. A method of assembling a thermally expandable piston having a piston rod in alignment within a cylinder and connecting the piston to a cooperating structure, comprising inserting the piston into the cylinder, heating the piston and the cylinder to expand and lodge the piston firmly within the cylinder, securing the piston rod to said cooperating structure and cooling the piston and the cylinder to contract the piston with the cylinder and provide uniform clearance therearound as the piston remains supported by the secured piston rod.

3. A method of assembling a dashpot having a thermally expandable piston held in alignment within a cylinder by a piston rod attached to the piston and secured to a cooperating structure, said method comprising inserting the piston in the cylinder, inserting the piston rods into pockets formed in the cooperating structure containing a liquid thermal setting material, heating the piston, cylinder and cooperating structure thereby expanding and lodging the piston firmly in the cylinder and thereby solidifying the thermal setting material while the piston is held firmly in the cylinder.

4. A method for assembling a gyroscope structure including at least one dashpot containing a thermally expandable piston having a flexible piston rod to be rigidly attached to a gimbal, said method comprising heating the gyroscopic structure to thermally expand and lodge the piston firmly within the dashpot, providing a pocket in said gimbal, inserting the piston rod into the pocket in the gimbal containing a heated liquid material, and allowing the structure to cool thereby solidifying the material in the pocket and rigidly bonding the piston rod to the gimbal.

5. A method for assembling a dashpot structure for damping oscillation of the gimbal of a gyroscope, said method comprising placing a piston having a flexible rod fixed thereto into a dashpot cylinder, heating the structure and thereby thermally expanding and lodging the piston firmly within the cylinder, providing a pocket in said gimbal, inserting the piston into the pocket in the gimbal, said pocket containing a heated liquid material, cooling the structure thereby solidifying the material in the pocket and securing the piston rod to the gimbal.

6. A method for assembling a gyroscope structure having at least one dashpot for damping oscillations of a gimbal, said method comprising placing a piston having a piston rod into the dashpot, inserting the piston rod into a cavity in the gimbal, filling said cavity with an epoxy resin, heating the structure and thereby thermally expanding and firmly lodging the piston within the cylinder with the piston rod held rigidly therein, said heating being operative to harden the epoxy resin, and cooling the structure thereby contracting the piston.

7. The method of assembling pistons within cylinders of a gyroscope and connecting the piston rods to the gimbal of the gyroscope which comprises providing socket openings in the gimbal in axial alignment with the cylinders, placing the pistons within the cylinders, filling the sockets in the gimbal with a thermo-setting plastic material, positioning the ends of the piston rods in the plastic material, then heating the gyroscope including the cylinders, pistons and gimbal to a temperature sufficient to cause the pistons to expand and contact the walls of the cylinder walls and to set the thermo-plastic material with the ends of the piston rods embedded therein, and finally cooling the gyroscope to contract the pistons and thus provide even circumferential spaces between the inside walls of the cylinders and the outside walls of the pistons.

8. In a gyroscope having a gimbal and an oscillation damping dashpot structure including a piston and a piston rod attached thereto, apparatus for attaching the piston rod to the gimbal comprising an arm integral with the gimbal, said arm having pockets in alignment with the dashpot structure, said piston rods extending into the pockets, and a plastic material within the pockets bonding the pistons rods to the gimbal.

9. An apparatus according to claim 8 wherein the plastic material comprises a thermal-setting resin which may be hardened by the application of heat.

10. In a gyroscope having a pair of cooperating parts, one of said parts being stationary, an oscillation damping dashpot structure on one of said parts including a piston and a piston rod attached thereto, apparatus for attaching the piston rod to the other of said cooperating parts comprising an arm integral therewith, said arm having pockets in alignment with the dashpot structure, said piston rods extending into said pockets, and a plastic material within the pockets bonding the piston rod to said other cooperating part.

References Cited in the file of this patent

UNITED STATES PATENTS

| | | |
|---|---|---|
| 1,330,501 | Tanner | Feb. 10, 1920 |
| 1,407,320 | Bouche | Feb. 21, 1922 |
| 2,709,921 | Sylvan | June 7, 1955 |